US010997392B2

(12) United States Patent
So et al.

(10) Patent No.: US 10,997,392 B2
(45) Date of Patent: May 4, 2021

(54) ELECTRONIC DEVICE CAPABLE OF FINGERPRINT RECOGNITION AND METHOD OF DRIVING THE SAME

(71) Applicant: SAMSUNG DISPLAY CO., LTD., Yongin-si (KR)

(72) Inventors: Yong Sub So, Suwon-si (KR); Sang Jin Pak, Yongin-si (KR); Moon Sang Hwang, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 27 days.

(21) Appl. No.: 16/220,095

(22) Filed: Dec. 14, 2018

(65) Prior Publication Data
US 2019/0197293 A1   Jun. 27, 2019

(30) Foreign Application Priority Data
Dec. 22, 2017  (KR) .......................... 10-2017-0178521

(51) Int. Cl.
*G06K 9/00* (2006.01)
*G06F 21/32* (2013.01)
*G06F 3/041* (2006.01)
*G06F 3/044* (2006.01)

(52) U.S. Cl.
CPC ......... *G06K 9/00087* (2013.01); *G06F 3/044* (2013.01); *G06F 3/0412* (2013.01); *G06F 21/32* (2013.01); *G06K 9/0004* (2013.01)

(58) Field of Classification Search
None
See application file for complete search history.

(56) References Cited

U.S. PATENT DOCUMENTS

| 8,285,009 | B2 | 10/2012 | Ikeda | |
| 2012/0262416 | A1* | 10/2012 | Kitamura | G06F 1/3262 345/174 |
| 2015/0331462 | A1* | 11/2015 | Atkinson | G06F 1/206 713/100 |
| 2020/0022085 | A1* | 1/2020 | Zhang | G06K 9/00013 |

FOREIGN PATENT DOCUMENTS

| KR | 10-2015-0121783 | 10/2015 |
| KR | 10-2016-0125872 | 11/2016 |

* cited by examiner

*Primary Examiner* — Nicholas J Lee
(74) *Attorney, Agent, or Firm* — F. Chau & Associates, LLC

(57) ABSTRACT

An electronic device, including a touch recognition unit; a display unit receiving a signal from the touch recognition unit; a fingerprint recognition unit receiving a signal from the display unit. A processor is configured to transmit and receive a signal to/from the touch recognition unit, the display unit, and the fingerprint recognition unit. The processor may remain in an inactive state while the touch recognition unit, display unit, and fingerprint recognition unit are activated. The processor is activated when a preset user's fingerprint input is provided. A method operates the electronic device.

20 Claims, 3 Drawing Sheets

ELECTRONIC DEVICE CAPABLE OF FINGERPRINT RECOGNITION AND METHOD OF DRIVING THE SAME

This application claims the benefit of Korean Patent Application No. 10-2017-0178521, filed on Dec. 22, 2017, in the Korean Intellectual Property Office, the disclosure of which is incorporated by reference herein in its entirety.

TECHNICAL FIELD

Embodiments of the inventive concept relate to an electronic device capable of fingerprint recognition and a method of driving the same.

DISCUSSION OF THE RELATED ART

Fingerprint recognition technology is widely used in mobile terminals such as smartphones, tablets, and notebooks. In particular, an electronic device whose security is enhanced by integrating a fingerprint recognition unit in addition to a unit for sensing a touch input of a user of an electronic device capable of displaying an image has been proposed.

However, a fingerprint recognition unit consumes relatively large amounts of power to operate than many of the operations performed by mobile terminals. As mobile terminals are primarily battery powered, operation of the fingerprint recognition unit can significantly decrease the length of time that a mobile terminal may operate without its battery being recharged.

SUMMARY

An embodiment of the inventive concept provides an electronic device having a fingerprint recognition function that minimizes power consumption during operation.

Another embodiment of the inventive concept provides a method of driving an electronic device having a fingerprint recognition function that minimizes power consumption during operation.

According to an exemplary embodiment of the inventive concept, an electronic device includes a touch recognition unit configured to detect a touch input; a display unit configured to receive a first signal from the touch recognition unit when the touch recognition unit detects the touch input; a fingerprint recognition unit configured to receive a second signal from the display unit; and a processor configured to transmit and receive a signal to/from one or more of the touch recognition unit, the display unit, and the fingerprint recognition unit. The processor enters an active state when a preset user's fingerprint input is provided.

An exemplary embodiment of the inventive concept is directed to a method of driving an electronic device, the method including: sensing, by a touch recognition unit, a touch input; activating, by the touch recognition unit, a display unit when the touch input is sensed; activating, by the display unit, a fingerprint recognition unit when the display unit is activated; and activating a processor depending on a response to a determination result of the fingerprint recognition unit.

According to an embodiment of the inventive concept, the fingerprint recognition unit determines whether or not a fingerprint input comprising the touch input is substantially identical with a predetermined threshold range of a preset user's fingerprint input is provided to a fingerprint recognition area that senses a user's fingerprint recognition.

However, embodiments of the inventive concept are not limited to the description set forth herein. The above and other embodiments of the inventive concept will become more apparent to one of ordinary skill in the art to which embodiments of the inventive concept pertains by referencing the detailed description hereinbelow.

BRIEF DESCRIPTION OF THE DRAWINGS

The embodiments of the inventive concept will be better-appreciated by a person of ordinary skill in the art with reference to the attached drawings, in which.

DETAILED DESCRIPTION OF THE EMBODIMENTS

Figure 1:
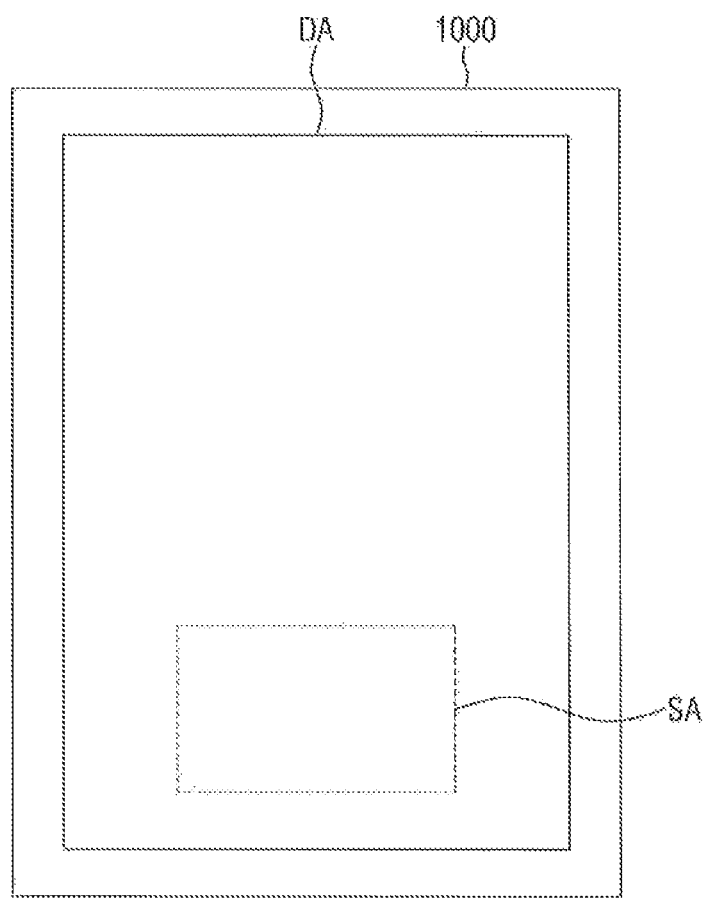
FIG. 1 is a schematic view of an electronic device according to an embodiment of the inventive concept.

In the following description, for the purposes of explanation, various details are set forth to provide a thorough understanding of various exemplary embodiments of the inventive concept. A person of ordinary skill in the art should understand and appreciate that various exemplary embodiments may be practiced without these specific details or with one or more equivalent arrangements. In other instances, well-known structures and devices are shown in block diagram form to avoid unnecessarily obscuring an artisan's appreciation of various exemplary embodiments of the inventive concept.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. Variations from the shapes of the illustrations as a result, for example, of manufacturing techniques and/or tolerances, are to be expected. Thus, the exemplary embodiments disclosed herein should not be construed as limited to the particular illustrated shapes of regions, or to the relative size of items in the drawings. Thus, there may be deviations in shapes of regions that result from, for instance, manufacturing techniques. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art as would be understood by a person of ordinary skill, and will not be interpreted in an idealized or overly formal sense, unless expressly so defined herein.

Hereinafter, exemplary embodiments will be described with reference to the accompanying drawings.

FIG. 1 is a schematic view of an electronic device according to an embodiment of the inventive concept.

The electronic device 1000 shown in FIG. 1 includes a display area DA and a fingerprint recognition area SA.

The display area DA is an area where an image is displayed by the electronic device 1000, and a display panel corresponding to the display area DA is disposed on the display area DA. The display panel may be, for example, an organic light emitting display panel or a liquid crystal display panel. However, any kind of display panel may be provided.

The display area DA may have a function of sensing a user's touch. For example, a touch sensing unit (described hereinafter) may determine whether or not the user's touch input on the display area DA is sensed, and to determine the position on the display area DA receiving the user's touch input. The touch sensing unit may sense a user's touch in the display area DA in various ways. For example, the sensing of touch may be implemented in an electrostatic manner. For example, the touch sensing unit may determine whether or not the user inputs a touch to the display area DA based on a change in capacitance between sensing electrodes due to the user's touch input. It should be understood that particularly with regard to capacitive type touch sensing, actual contact does not have to be made with the display area. For example, "near touch" where a user places their finger or a stylus within proximity sufficiently close to the display area DA to cause a change in capacitance between the sensing electrodes. In another example, the sensing of touch may be implemented in a pressure-sensitive manner. For example, the touch sensing unit may determine whether or not the user inputs a touch based on a change in pressure due to the user's touch input using a piezoelectric sensor. A person of ordinary skill in the art should understand and appreciate that other types of touch sensing units may be employed. For example a surface acoustic wave (S.A.W.), resistive, and infrared touch technology, are just some of the non-limiting examples of the types of touch sensing that may be employed in the display area DA. The fingerprint recognition area SA may be disposed in any area within the display area DA. The fingerprint recognition area SA may determine whether or not the user's touch input is a fingerprint input, in addition to the function of sensing the user's touch input. However, as a fingerprint recognition function may not remain active during typical operations of the mobile terminal due to the drain on a battery, there may be difficulty in determining whether or not the user's touch area corresponds to the fingerprint recognition area SA. Thus, when the fingerprint recognition function is not active, or when the device may be operating in an energy saving mode, the fingerprint recognition area SA may play a role of displaying an image, as a part of the display area DA.

The fingerprint recognition area SA may be integrated with the display panel and disposed on the display panel. However, embodiments of the inventive concept are not limited thereto, and the fingerprint recognition area SA may be formed by adding a specific module to the display panel.

In a method of operation, determining whether or not the user's touch input provided to the fingerprint recognition area SA is a fingerprint input, an optical sensor may be used. For example, a separate optical sensor may be additionally disposed on the display panel to determine whether the user's touch input is a fingerprint input by using the light emitted from the display panel. Alternatively, in the method of determining whether or not the user's touch input is a fingerprint input, rather than using an optical sensor, a touch sensing unit may recognize an ultrafine pattern composed of the user's fingerprints, thereby determining whether the user's touch input is a fingerprint input.

Although it is described in this embodiment of the inventive concept and shown in FIG. 1 that the fingerprint recognition area SA is an area within the display area DA, but a person of ordinary skill in the art should appreciate that embodiments of the inventive concept are not limited to the arrangement shown in FIG. 1. For example, the fingerprint recognition area SA may be disposed to have the same shape and size as the display area DA, may be larger than the display area DA, or may be separately provided in addition to the display area DA. In addition, it is possible that there can be a fingerprint recognition area arranged along a side or the back of the mobile terminal, for example, adjacent to a camera lens.

Although it is illustrated in this embodiment of the inventive concept that the electronic device includes the display area DA and the fingerprint recognition area SA, such a configuration is a simplified configuration, and may further include other components. For example, a button for controlling the electronic device, a speaker for outputting the sound of the electronic device, a connection terminal for connection with another device, a camera lens for shooting self-photos, etc., and the like may be additionally provided.

Figure 2:
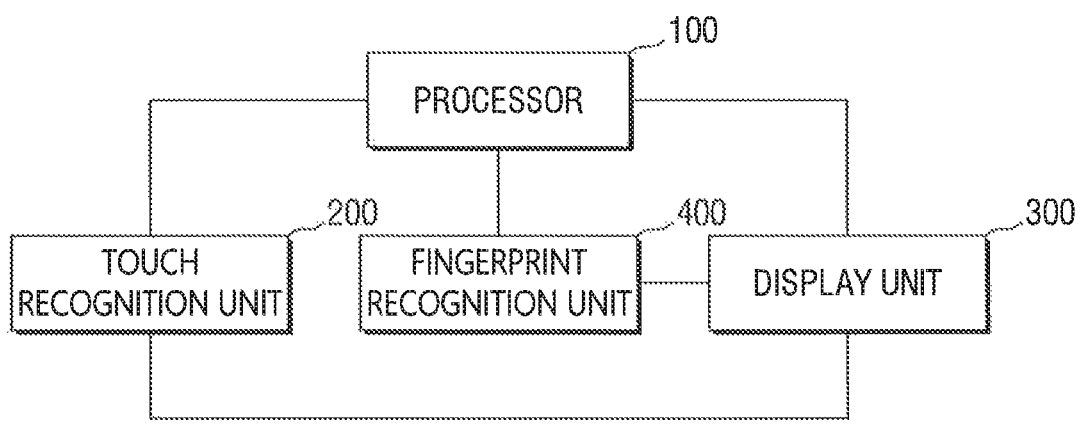
FIG. 2 is a block diagram of the electronic device according to the embodiment of the inventive concept shown in FIG. 1.

FIG. 2 is a block diagram of the electronic device such as in the embodiment of FIG. 1.

Referring to FIG. 2, the electronic device 1000 includes, for example, a processor 100, a touch recognition unit 200, a display unit 300, and a fingerprint recognition unit 400.

The processor 100 plays a role of controlling all the functions of the electronic device 1000. For example, the processor 100 may provide information about an image provided to the display area DA to the display unit 300, and may control a communication with other electronic devices.

The processor 100 may be implemented as one or more application specific integrated circuits (ASICs), a digital signal processor (DSP), a digital signal processing device (DSPD), a programmable logic device (PLD), a field programmable gate array (FPGA), a controller, a microcontroller, a microprocessor, an Advanced Reduced Instruction Set Computer (RISC) Machine (e.g., ARM-based processor), or other electronic components.

In this embodiment of the inventive concept, the processor 100 may be maintained in a sleep mode until a preset user's fingerprint input is provided. For example, the processor 100 may be activated by the preset user's fingerprint input, and thus the mode of operation changes from a sleep mode to an active mode. When the preset user's fingerprint input is not provided, the processor 100 may not be activated. While the processor 100 is maintained in the sleep mode, the power consumption by the processor 100 does not occur or is minimized as compared to an active mode, so that the power consumption of the electronic device 1000 can be minimized.

In particular, even if the preset user's fingerprint input is provided, the processor 100 may be maintained in the sleep mode until the preset user's fingerprint input is recognized. Thus, even if the touch recognition unit 200, the fingerprint recognition unit 400, and the display unit 300 are activated by an improper touch input of the user, or it the preset user's fingerprint input is not recognized, the processor 100, which consumes the most power is maintained in the sleep mode, so that the power consumption of the electronic device 1000 can be minimized. In other words, the touch recognition unit 200 and/or the fingerprint recognition unit 400 may operate while the processor is maintained in the sleep mode. For example, if the touch recognition unit 200 is a microcontroller, it uses less power than the processor 100. When the electronic device 1000 is driven by a battery, the usage time of the electronic device 1000 between recharges can be increased.

The processor 100 may be connected to the touch recognition unit 200, the display unit 300, and the fingerprint recognition unit 400, respectively. Thus, after the processor 100 is activated by the preset user's fingerprint input, the touch recognition unit 200, the display unit 300, and the fingerprint recognition unit 400 can be controlled by the commands of the processor 100, and can perform various functions.

The touch recognition unit 200 senses a user's touch input. For example, the touch recognition unit 200 includes a touch panel and a touch control unit (not shown), senses whether or not external force applied to the touch panel is the user's touch input by using the touch panel and the touch control unit, and determines the position of the user's touch input on the touch panel.

Although not shown in the drawings, the touch panel may be mounted to correspond to the display area DA, and in some embodiments of the inventive concept, the touch panel may be formed to be integrated with the display panel.

The touch control unit determines whether or not the external force applied to the touch panel is really the user's touch input by using information received from the touch panel, and determines to which position the user's touch input is provided if the user's touch input is provided. The touch control unit may be implemented as one or more application specific integrated circuits (ASICs), a digital signal processor (DSP), a digital signal processing device (DSPD), a programmable logic device (PLD), a field programmable gate array (FPGA), a controller, a microcontroller, a microprocessor, an ARM-based processor or other electronic devices.

The touch recognition unit 200 may maintain an active mode to recognize the user's touch input even when the processor 100 is in, for example, a sleep mode. For example, the touch recognition unit 200 may operate by periodic polling in active mode. Alternatively, the touch recognition unit 200 may be interrupt driven. For example, there can be voice activation, for example, where a sound directed at the speaker of the mobile terminal may activate the touch recognition unit 200. Of course, although power is consumed to drive the touch recognition unit 200, the amount of power that drives the touch recognition unit 200 is much less than the power used to drive the processor 100, so that the power can be efficiently used. Moreover, the touch recognition unit 200 may be configured to be underclocked, for example, operated at a relatively lower clock speed until the user's touch input is provided, thereby minimizing power consumption. For example, after a certain period of time in which the touch recognition unit 200 has not been touched, the clock speed may be decreased.

When the touch recognition unit 200 senses the user's touch input, the touch recognition unit 200 may activate the display unit 300 as well as may be driven to determine the position to which the user's touch input is applied. For this purpose, the touch recognition unit 200 and the display unit 300 may be electrically connected with each other to transmit signals. More specifically, when each of the components for processing the signals of the touch recognition unit 200 and the display unit 300 are implemented in a chip form, one of input and output ports of the chip constituting the touch recognition unit 200 may be electrically connected to one of input and output ports of the chip constituting the display unit 300 through a common transmission line for signal or power, for example, through a bus.

The display unit 300 displays an image on the display area DA. More specifically, the display unit 300 includes a display panel and a display control unit (not shown), and may display an image using information about the image received from the processor 100. However, in this embodiment of the inventive concept, even when the processor 100 is not in the active mode, the display unit 300 may receive a signal from the touch recognition unit 200 to display a preset image. Here, the preset image displayed by the signal received from the touch recognition unit 200 is an image for fingerprint recognition, which is mainly displayed on the fingerprint recognition area SA of the display area DA (see FIG. 1).

Although not shown in the drawings, as described above, the display panel may be mounted so as to correspond to the display area DA, and in some embodiments of the inventive concept, the display panel may be formed to be integrated with the touch panel.

The display control unit displays an image on the display area DA using information received from the processor 100, or display the preset image on the display area DA and the fingerprint recognition area SA by allowing the display control unit to be activated by the touch recognition unit 200.

As described above, when the fingerprint recognition of the electronic device 1000 is performed by an optical sensor, the display unit 300 may display an image having sufficient luminance to be recognized by the optical sensor on the fingerprint recognition area SA.

The display control unit may be implemented as one or more application specific integrated circuits (ASICs), a digital signal processor (DSP), a digital signal processing device (DSPD), a programmable logic device (PLD), a field programmable gate array (FPGA), a controller, a microcontroller, a microprocessor, an ARM-based processor, or other electronic devices.

The display unit 300 may be maintained in a sleep mode as long as there is no activation signal received. However, when the touch recognition unit 200 instructs the activation of the display unit 300, for example, through transmitting of the activation signal, the sleep mode may end, and operation of an active mode may begin.

In addition, subsequent to the display unit 300 being activated by the touch recognition unit 200, the fingerprint recognition unit 400 may be activated in addition to the operation of displaying the preset image. For this purpose, the display unit 300 and the fingerprint recognition unit 400 may be electrically connected with each other to transmit signals. For example, when each of the components for processing the signals of the display unit 300 and the fingerprint recognition unit 400 are implemented in a chip form, one of input and output ports of the chip constituting the display unit 300 may be electrically connected to one of input and output ports of the chip constituting the fingerprint recognition unit 400 through a common transmission line for signal or power, for example, through a bus.

The fingerprint recognition unit 400 determines whether or not the user's touch input provided to the fingerprint recognition area SA is a fingerprint input, and determines whether the fingerprint input matches a preset user's fingerprint input if the user's touch input is the fingerprint input. For example, the fingerprint recognition unit 400 includes a fingerprint recognition panel and a fingerprint recognition control unit (both not shown). Although not shown in the drawings, the fingerprint recognition panel may be mounted to correspond to the fingerprint recognition area SA (e.g., see FIG. 1), and in some embodiments of the inventive concept, the fingerprint recognition panel may be formed to be integrated with the display panel.

The fingerprint recognition control unit determines whether or not the external force applied to the fingerprint recognition panel is a preset user's fingerprint input by using information received from the fingerprint recognition panel.

The fingerprint recognition control unit may be implemented as one or more application specific integrated circuits (ASICs), a digital signal processor (DSP), a digital signal processing device (DSPD), a programmable logic device (PLD), a field programmable gate array (FPGA), a controller, a microcontroller, a microprocessor, an ARM-based processor, or other electronic components.

According to an embodiment of the inventive concept, the fingerprint recognition unit 400 may be maintained in a sleep mode as long as there is no special signal, for example, an activation signal. However, when the display unit 300 instructs the activation of the fingerprint recognition unit 400, the fingerprint recognition unit 400 may switch from the sleep mode to an active mode.

In addition, when the user's fingerprint input provided to the fingerprint recognition panel is substantially identical (e.g., within a predetermined threshold or percentage) with the preset user's fingerprint, the fingerprint recognition unit 400 may activate the processor 100.

Hereinafter, a method of driving the electronic device 1000 for minimizing power consumption will be described.

Figure 3:
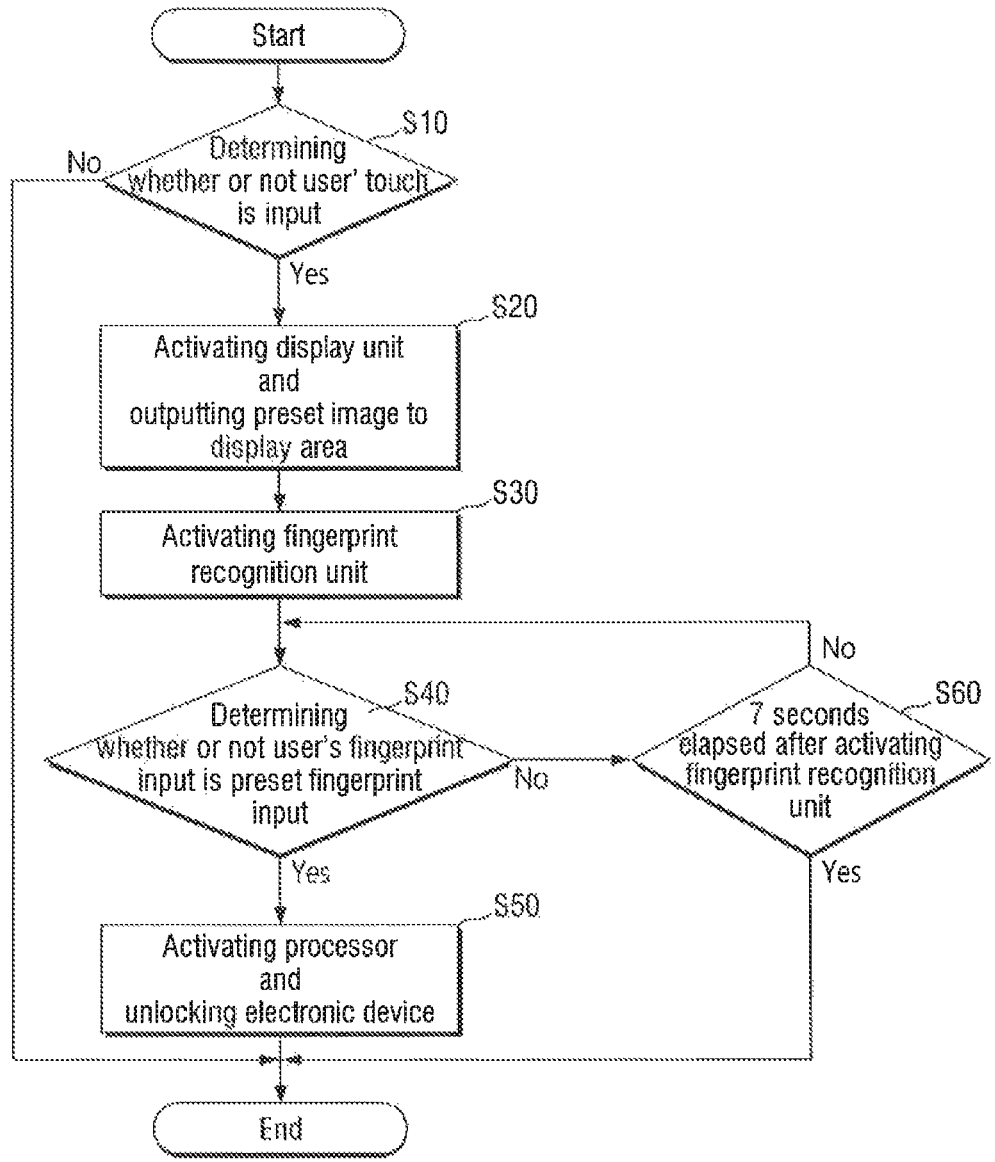
FIG. 3 is a flowchart illustrating a method of driving the electronic device according to the embodiment of FIG. 1.

FIG. 3 is a flowchart illustrating a method of driving the electronic device according to the embodiment of FIG. 1.

Referring to FIG. 3, at operation (S10), it is determined whether or not a user's touch input is provided to the display area DA. For example, the touch recognition unit 200 may determined whether or not the user's touch input is provided. Until such time that the touch recognition unit 200 determined that the user's touch input is provided, the processor 100, the display unit 300, and the fingerprint recognition unit 400 may be maintained in a sleep mode to minimize power consumption. It is within an embodiment of the inventive concept that all of the processor 100, display unit 300 and fingerprint recognition unit 400, may be maintained in a sleep mode, or one or more of the aforementioned items may be in a sleep mode. For example, just the display unit 300 may be a sleep mode, or the processor 100 and the fingerprint recognition unit 400 may be maintained in a sleep mode until the touch recognition unit 200 determines at S10 that a user's touch input has been detected.

When it is determined that the user's touch input is provided, then at operation (S20), the mode of the display unit 300 is changed from the sleep mode to an active mode, and a preset image is output to the display area DA.

The display unit 300 may be directly connected to the touch recognition unit 200 as described above, and may receive a signal utilized for activation from the touch recognition unit 200. Also, the display unit 300 may output a preset image for fingerprint recognition to the display area DA without the instruction of the processor 100. For example, when the display unit 300 is activated by the touch recognition unit 200 to change the mode of the display unit 300 from the sleep mode to an active mode, the processor 100 still maintains the sleep mode so as to conserve power and extend battery life.

Next, at (S30) the mode of the fingerprint recognition unit 400 is changed from a sleep mode to an active mode, and it is determined whether the user's fingerprint input provided to the fingerprint recognition area SA is substantially identical with a preset user's fingerprint input is determined. While the determination may of the user's fingerprint input provided to the fingerprint recognition area SA may be based on whether the preset user's fingerprint input is identical, in some operations, it may be more time consuming and could reduce the amount of power being minimized, particularly, for example, if the device denies access and the user must attempt multiple retries to be able to access the device, as each operation will expend battery power. Thus, for example, a pattern recognition of certain amount of the user's present fingerprint may, in some embodiments of the inventive concept, provide reasonable security with greater savings in power consumption. For example, a 90% area of the user's fingerprint input comparing favorably with the preset fingerprint input may be desirable as a user programmable default. As discussed hereinabove, a substantially identical pattern recognition may reduce retries and save energy. A person of ordinary skill in the art should understand and appreciate that the example of a 90% area of the user's fingerprint being identical is provided for illustrative purposes only, and such an amount could be higher or lower, according to a user's desire. In addition, some devices, e.g. thin client devices, may have a battery or batteries that have less capacity than other mobile terminals, and may be a factor in determining whether to seek an identical comparison, or a substantially identical comparison of the fingerprint input.

As shown in FIG. 3, the fingerprint recognition unit 400 is directly connected to the display unit 300, and may receive a signal utilized for activation from the display unit 300. Further, when the fingerprint recognition unit 400 is activated by the display unit 300 to change the mode of the fingerprint recognition unit 400 from a sleep mode to an active mode, the processor 100 may stay in the sleep mode while the other devices are in operation.

Next, at operation (S40), it may be determined as to whether the user's fingerprint input is a preset fingerprint input.

When it is determined that the user's fingerprint input is identical (or substantially identical as discussed hereinabove in some embodiments of the inventive concept) with the preset fingerprint input, the processor 100 is activated by the fingerprint recognition unit 400 to change from the sleep mode to an active mode. For example, the recognition unit may send an interrupt signal to the processor 100 to cause the processor 100 to enter an active mode, and at operation (S50), the electronic device 1000 may be unlocked.

For example, according to an embodiment of the inventive concept only when an input identical with the present user's fingerprint input is provided, the processor 100 is activated, so that the power consumption required for driving the processor 100 can be minimized. In another embodiment of the inventive concept, a portion of the present user's fingerprint may be sufficient according to a predetermined threshold to activate the processor 100.

Still referring to FIG. 3, at (S60) when it was determined at (S40) that the user's fingerprint input is not the preset fingerprint input, the fingerprint recognition unit 400 continues to wait for input of the fingerprint or ends a determination process depending on the time elapsed after activation of the fingerprint recognition unit 400. It is also shown in FIG. 3 that, for example, if 7 seconds have not elapsed after activating the fingerprint recognition unit 400, the process may then perform operation (S40) again. A person of ordinary skill in the art should understand and appreciate that the embodiments of the inventive concept are not limited to 7 seconds at operation S60, and its amount can be longer or shorter.

In an embodiment of the inventive concept, there may additional security provided by a counter that limits the number of attempts to perform operation (S40). After a certain number of retries the device may activate an alarm, send a wireless signal to a server that an excessive amount of unsuccessful attempts have been reached. In addition, the display area may display a message when the user's fingerprint input is not identical (or substantially identical) with a present fingerprint input. An audible message or, for example, a beep, could also or alternatively be output.

As described above, according to the embodiments of the inventive concept, an electronic device having a fingerprint recognition function and minimizing power consumption may be provided.

Further, a method of driving an electronic device having a fingerprint recognition function and minimizing power consumption may be provided.

Although several embodiments of the inventive concept have been disclosed for illustrative purposes, those skilled in the art will appreciate that various modifications, additions and substitutions are possible, without departing from the scope and spirit of the inventive concept as recited by the accompanying claims.

What is claimed is:
1. An electronic device, comprising:
a touch recognition unit configured to detect a touch input and to increase a clock speed from a first speed to a second speed based on the touch input for a predetermined time period;
a display unit configured to receive a first signal from the touch recognition unit when the touch recognition unit detects the touch input;
a fingerprint recognition unit configured to receive a second signal from the display unit; and
a processor configured to transmit and receive a signal to/from one or more of the touch recognition nut, the display unit, and the fingerprint recognition unit, wherein the processor is further configured to be maintained in a sleep mode until a provided preset user's fingerprint is recognized as at least substantially identical by a predetermined amount to a preset fingerprint input, wherein the processor enters an active state.

2. The electronic device of claim 1, wherein the touch recognition unit detects whether the touch input is provided on a display area of the display unit on which an image is displayed.

3. The electronic device of claim 2, wherein the touch recognition unit activates the display unit when the touch recognition unit detects the touch input is provided on the display area; and
the touch recognition unit is configured to decrease the clock speed from the second speed to the first speed when a time period elapses from the touch input without detection of another touch input.

4. The electronic device of claim 3, wherein
the touch recognition unit comprising a chip having one or more input ports and one or more output ports, and
wherein one of the input ports and one of the output ports of the chip comprising the touch recognition unit is electrically connected through a bus to one of an input port and an output port of a chip comprising a controller of the display unit.

5. The electronic device of claim 4, wherein the display unit is configured to output a preset image to the display area when the display unit is activated by the touch recognition unit.

6. The electronic device of claim 5, wherein the processor is maintained in an inactive state while the preset image is output.

7. The electronic device of claim 1, wherein the display unit is configured to activate the fingerprint recognition unit when the display unit is activated by the touch recognition unit.

8. The electronic device of claim 7, wherein the fingerprint recognition unit determines whether or not a fingerprint input comprising the touch input is identical with a preset user's fingerprint input is provided to a fingerprint recognition area that senses a user's fingerprint recognition.

9. The electronic device of claim 8, wherein the processor is maintained in an inactive state while the fingerprint recognition unit determines whether or not the fingerprint input identical with the preset user's fingerprint input is provided to the fingerprint recognition area.

10. The electronic device of claim 7, wherein one of an input port and an output port of a chip constituting the display unit is electrically connected through a bus to one of an input port and an output port of a chip constituting the fingerprint recognition unit.

11. The electronic device of claim 1, wherein the fingerprint recognition unit is configured to sense a user's fingerprint input via an optical sensor, and
wherein light to drive the optical sensor is provided from the display unit.

12. The electronic device of claim 1, wherein the display unit includes a display panel and a display control unit.

13. The electronic device of claim 12, wherein the touch recognition unit includes a touch panel and a touch control unit, and
the touch panel is integrated with the display panel.

14. The electronic device of claim 12, wherein the fingerprint recognition unit includes a fingerprint recognition panel and a fingerprint recognition control unit, and
the fingerprint recognition panel is integrated with the display panel.

15. A method of driving an electronic device, comprising:
sensing, by a touch recognition unit, a touch input;
activating, by the touch recognition unit, a display unit when the touch input is sensed;
activating, by the display unit, a fingerprint recognition unit when the display unit is activated; and
activating a processor in response to a determination result of the fingerprint recognition unit that a user's fingerprint is at least substantially identical by a predetermined amount to a preset fingerprint input, wherein the processor is maintained in a sleep state until the user's fingerprint is recognized.

16. The method of claim 15, further comprising outputting, by the display unit, a preset image on a display area on which an image is displayed.

17. The method of claim 16, further comprising maintaining the processor in an inactive state while the preset image is output by the display unit.

18. The method of claim 15, further comprising determining, by the fingerprint recognition unit, whether or not a fingerprint input identical with a preset user's fingerprint input is provided to a fingerprint recognition area sensing a user's fingerprint recognition, when the fingerprint recognition unit is activated.

19. The method of claim 18, further comprising maintaining the processor in an inactive state while the fingerprint recognition unit determines whether or not the fingerprint input is substantially identical with the preset user's fingerprint input provided to the fingerprint recognition area.

20. The method of claim 15, wherein the activating the processor is performed when a fingerprint input provided by a user is identical with a preset fingerprint input.

* * * * *